United States Patent
Ramaraju et al.

(10) Patent No.: US 9,081,719 B2
(45) Date of Patent: *Jul. 14, 2015

(54) SELECTIVE MEMORY SCRUBBING BASED ON DATA TYPE

(75) Inventors: Ravindraraj Ramaraju, Round Rock, TX (US); William C. Moyer, Dripping Springs, TX (US); Andrew C. Russell, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 252 days.

This patent is subject to a terminal disclaimer.

(21) Appl. No.: 13/588,194

(22) Filed: Aug. 17, 2012

(65) Prior Publication Data

US 2014/0052924 A1 Feb. 20, 2014

(51) Int. Cl.
  *G06F 12/00* (2006.01)
  *G06F 12/12* (2006.01)

(52) U.S. Cl.
  CPC ..................... *G06F 12/12* (2013.01)

(58) Field of Classification Search
  USPC ........................................................ 711/133
  See application file for complete search history.

(56) References Cited

U.S. PATENT DOCUMENTS

| | | | |
|---|---|---|---|
| 5,303,190 | A | 4/1994 | Pelley, III |
| 6,766,431 | B1 | 7/2004 | Moyer |
| 6,772,383 | B1 | 8/2004 | Quach et al. |
| 7,100,004 | B2 * | 8/2006 | Chen Johnson et al. ...... 711/159 |
| 7,434,012 | B1 * | 10/2008 | Ives et al. ........................ 711/159 |
| 7,437,597 | B1 | 10/2008 | Kruckemyer et al. |
| 7,564,093 | B2 | 7/2009 | Matsuda |
| 7,606,980 | B2 | 10/2009 | Qureshi et al. |
| 7,716,428 | B2 | 5/2010 | Guthrie et al. |
| 7,882,323 | B2 * | 2/2011 | Allison et al. ................. 711/167 |
| 8,024,638 | B2 | 9/2011 | Resnick et al. |
| 2003/0191888 | A1 * | 10/2003 | Klein ............................ 711/105 |
| 2004/0243886 | A1 | 12/2004 | Klein |
| 2007/0011513 | A1 | 1/2007 | Biswas et al. |
| 2009/0144503 | A1 | 6/2009 | Faucher et al. |
| 2010/0176841 | A1 | 7/2010 | Jang et al. |
| 2010/0191990 | A1 | 7/2010 | Zhang et al. |

OTHER PUBLICATIONS

K. Flautner et al., Drowsy Caches: Simple Techniques for Reducing Leakage Power, 29th Annual International Symposium on Computer Architecture, 2002.

(Continued)

*Primary Examiner* — Matthew Bradley
(74) *Attorney, Agent, or Firm* — Terrile, Cannatti, Chambers & Holland, LLP; Stephen A. Terrile

(57) ABSTRACT

A method for minimizing soft error rates within caches by controlling a memory scrubbing rate selectively for a cache memory at an individual bank level. More specifically, the disclosure relates to maintaining a predetermined sequence and process of storing all modified information of a cache in a subset of ways of the cache, based upon for example, a state of a modified indication within status information of a cache line. A cache controller includes a memory scrubbing controller which is programmed to scrub the subset of the ways with the modified information at a smaller interval (i.e., more frequently) compared to the rest of the ways with clean information (i.e., information where the information stored within the main memory is coherent with the information stored within the cache).

18 Claims, 3 Drawing Sheets

(56) References Cited

OTHER PUBLICATIONS

S. Jahinuzzaman et al., A Soft Tolerant 10T SRAM Bit-Cell With Differential Read Capability, IEEE Transactions on Nuclear Science, vol. 56, No. 6, Dec. 2009.

R. Naseer et al., The DF-Dice Storage Element for Immunity to Soft Errors, 48th Midwest Symposium on Circuits and Systems, Aug. 7-10, 2005 pp. 303-306.

Tezzaron Semiconductor, Soft Errors in Electronic Memory—A White Paper, Version 1.1, Jan. 5, 2004.

J. Barth et al., A 45nm SOI Embedded DRAM Macro for POWER7(Tm) 530319032MB On-Chip L3 Cache, IEEE International Solid-State Circuits Conference, Session 19, High-Performance Embedded Memory 19.1, 2010.

IBM Techdocs FAQ: Power 6 Frequently Asked Question, What is Hardware Assisted Memory Scrubbing and how is it used?, printed Jul. 13, 2012.

Wikipedia.org, Error detection and correction, Error-correcting code, printed Jul. 13, 2012.

Wikipedia.org, Memory scrubbing, printed Jul. 13, 2012.

F. Ootsuka et al., A Novel 0.25 Full CMOS SRAM Cell Using Stacked Cross Couple with Enhanced Soft Error Immunity, Proc. Int. Electron Devices Meeting, 1998, pp. 205-208.

* cited by examiner

SELECTIVE MEMORY SCRUBBING BASED ON DATA TYPE

CROSS-REFERENCE TO RELATED APPLICATION

U.S. patent application Ser. No.13/588,243, entitled "Data Type Dependent Memory Scrubbing" by inventors Ravindraraj Ramaraju, William C. Moyer, and Andrew C. Russell, filed on Aug.17, 2012, describes exemplary methods and systems and is incorporated by reference in its entirety.

BACKGROUND OF THE INVENTION

1. Field of the Invention

The present invention relates in general to the field of improving the error resilience of memories.

2. Description of the Related Art

In general, data processing systems comprise a processor (often referred to as a central processing unit (CPU)) that executes instructions that are fetched from a main memory. One method to improve the performance of the processor is to use cache memory. Cache memory is high speed memory that works with the processor and the main memory to quickly provide information (e.g., instructions and/or data) to the processor. By using a cache architecture, a faster response time is possible than when the processor fetches all information directly from the main memory. The improved performance is possible because the cache usually contains the information that the processor is likely to request from memory. The cache is typically faster than the main memory; therefore, the cache can usually provide the data required by the processor much faster than the main memory. Part of the methodology used to load information into the cache is to predict and store the information that is frequently used by the processor and is likely to be used by the processor.

When the cache contains information requested by the processor, this is referred to as a cache hit. If the cache does not contain the information requested by the processor, then this is referred to as a cache miss. On a miss, the information is loaded from the main memory into the cache and is also provided to the processor. The information is loaded into the cache in anticipation that the processor will request the data in an upcoming bus cycle. This process continues throughout the operation of the data processing system.

Caches typically include a cache tag array and a cache data array. Each array is organized into a number of cache lines. Each cache line includes a tag portion (contained in the cache tag array) and a storage portion (contained in the cache storage array). The tag value in a line is compared with the address of a memory request from the processor to determine whether the requested data is present in the storage portion of that cache line. Validity information is associated with each cache line to indicate whether the line contains currently valid information and whether the information conforms to the information stored within the main memory (referred to as cache coherency). Additionally, for caches which can operate in a copyback or writeback mode, additional status information is retained to indicate whether the cache line is modified (dirty) relative to the value stored in main memory. One example of a protocol for cache coherency is the modified, exclusive, shared, invalid (MESI) protocol.

One issue relating to caches is that with the scaling of technology and power supply, the bit cells are often more sensitive to soft errors. Another issue relating to caches is that to reduce the standby leakage power, the cache memories are often retained in a low power state during inactive state. This low power state is known to contribute towards increase in soft errors rates (SER).

BRIEF DESCRIPTION OF THE DRAWINGS

The present invention is illustrated by way of example and not limitation in the accompanying figures, in which like references indicate similar elements, and in which.

DETAILED DESCRIPTION

In general embodiments of the present invention, the present invention relates to a method for minimizing soft error rates within caches by controlling a memory scrubbing rate selectively for a cache memory at an individual bank level. More specifically, in certain embodiments, the invention relates to maintaining a predetermined sequence and process of storing all modified information of a cache in a selected subset of ways of the cache. A cache controller includes a memory scrubbing controller which is programmed to scrub the selected subset of the ways with potentially modified information at a smaller interval (i.e., more frequently) compared to the rest of the ways with clean information (i.e., information where the information stored within the main memory is coherent with the information stored within the cache). Because there is an additional location of the clean information (i.e., there is a back-up of the clean information), if a single event upset (SEU) error event occurs, the error can be detected and correct data can be reloaded from the back up memory source.

In certain embodiments, the memory scrubbing controller programming and the subset of ways upon which the smaller interval is applied can be dynamically changed or controlled. By providing a differential scrubbing rate for preventing or minimizing SER errors, modified data can be made more resilient to SER while consuming lower power for scrubbing operation.

Figure 1:
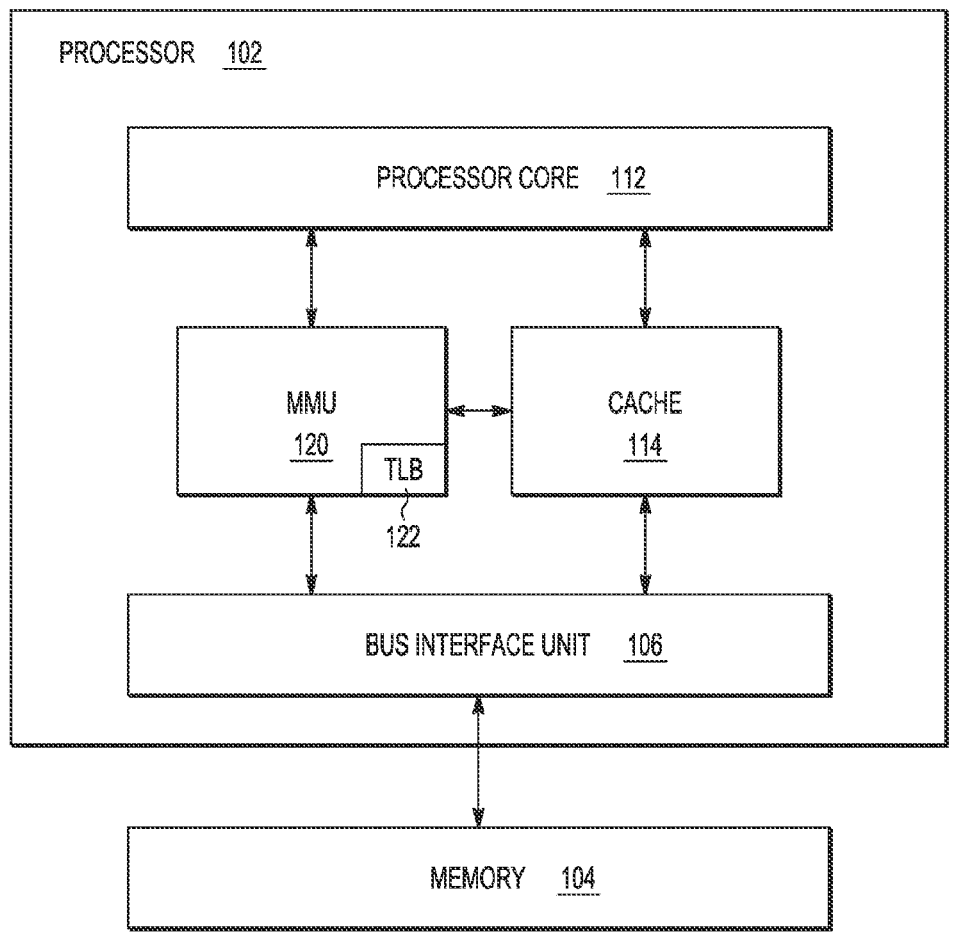
FIG. 1 shows a block diagram of a data processing system.

Referring to FIG. 1, a block diagram of a data processing system 100 is shown. The data processing system includes a processor 102 as well as a memory 104 and a bus interface unit 106, The processor 102 includes at least one processor core 112 as well as a cache 114. It will be appreciated that while the data processing system 100 shows a single unified cache, separate instruction and data caches are contemplated. The processor 102 is coupled to the memory 104 via the bus interface unit 106. The memory 104 and the cache 114 are managed by a memory management unit (MMU) 120. The MMU 120 includes a translation lookaside buffer (TLB) 122. The memory 104 includes one or more memory devices. The components of the data processing system 100 are coupled together by various buses used to pass control, address, and data signals.

Figure 2A:
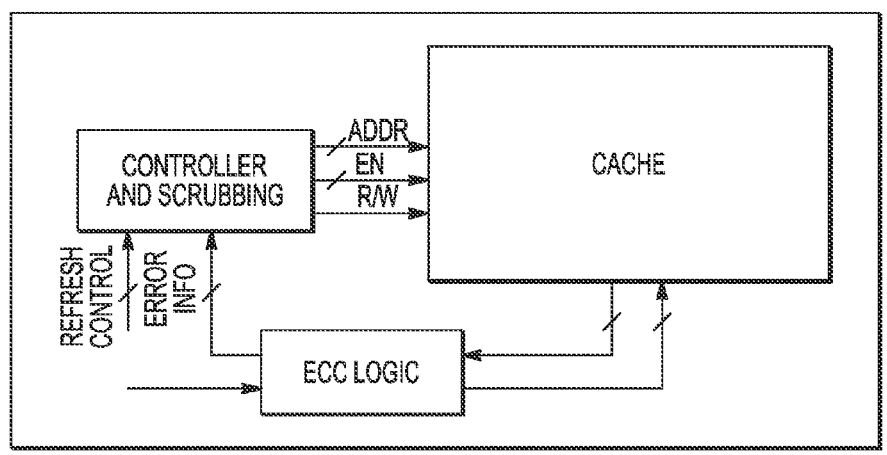
FIGS. 2A and 2B, generally referred to as FIG. 2, show block diagrams of a cache system.

Referring to FIG. 2A, a block diagram of a cache system 200 is shown. The cache system 200 includes the cache 114 as well as a controller 212 and error correction code (ECC) logic 216. The controller 212 receives a refresh control signal and provides an address signal (ADDR), an enable signal (EN) and a read/write signal (R/W) to the cache 114. The ECC logic 216 provides and receives information from the cache 114. The ECC logic also provides error information to the controller 212.

Figure 2B:
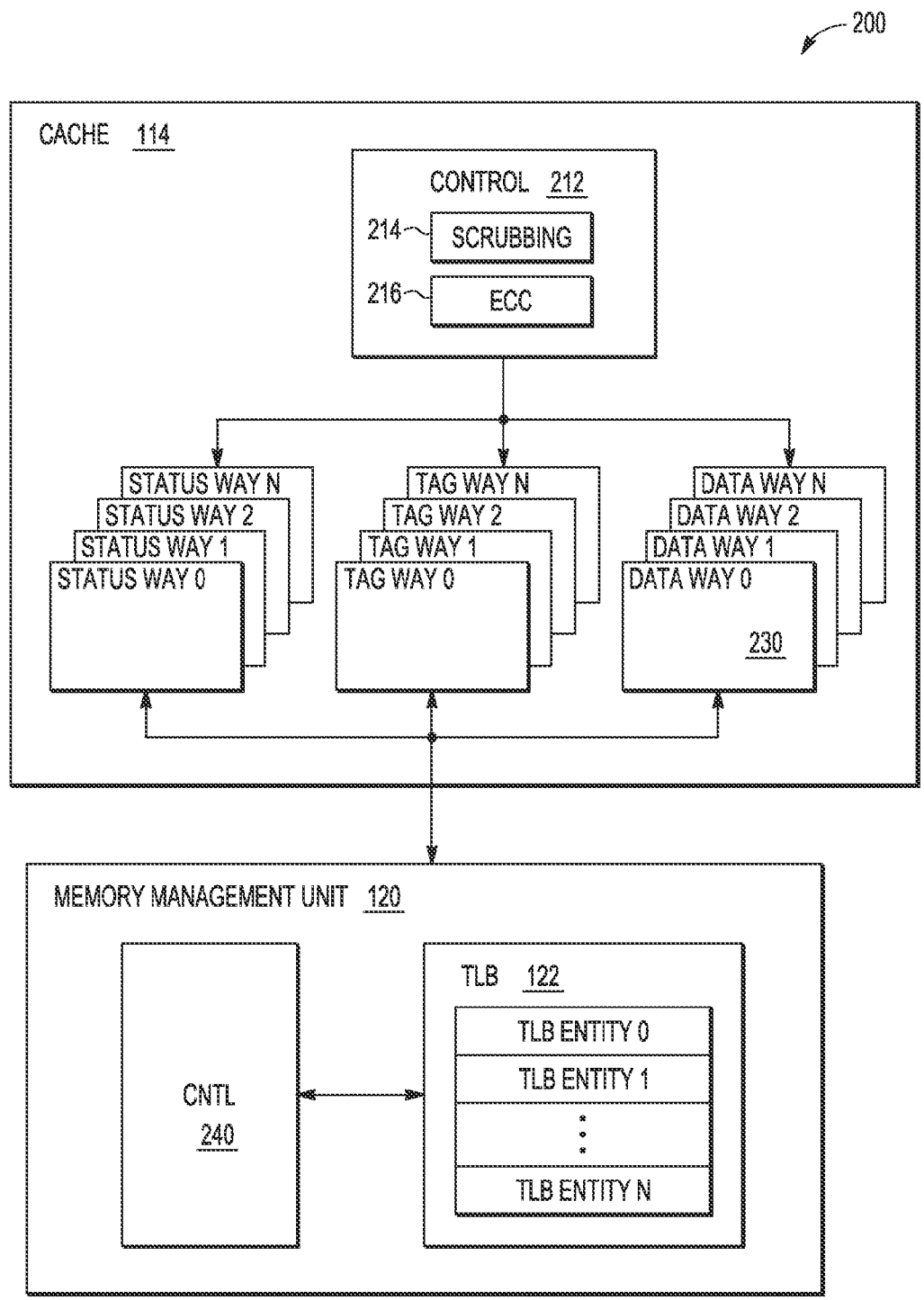

Referring to FIG. 2B, a more detailed block diagram of a cache system 200 is shown. The cache 114 includes the control logic 212, which controls the various operations of the cache 114. The control logic 212 includes a memory scrubbing controller 214 as well as the error correction code (ECC) controller 216. In certain embodiments, the control logic corresponds to a cache coherency protocol such as the MESI cache coherency protocol.

The cache further includes a plurality of cache ways (also referred to as banks) 230 (WAY 0, WAY 1, WAY 2, WAY N). Each way includes a plurality of cache lines. In certain embodiments, the cache ways 230 further include a plurality of status ways 232, a plurality of tag ways 234, and a plurality of data ways 236. The combination of the information from a line of the status ways 232, a line of the tag ways 234, and the data ways 236, provide a cache line. It will be appreciated that these ways may be separate or combined as a matter of design choice. in certain embodiments, the status ways store information used by the control logic 212 to perform the MESI cache coherency protocol.

The memory scrubbing controller 214 controls a scrubbing operation which is performed on the cache arrays. A scrubbing operation is a technique where entries of memory are accessed (e.g., periodically) and any entry with an error (such as an ECC error) is rewritten with the faulty data corrected. A scrubbing operation is performed when the cache is inactive (i.e., no read or write access is being performed on the cache) and occurs in the background. The scrubbing operation performs a read operation on a cache entry and then performs an error check on the data read from the entry. If an error is detected, then the data is corrected with the error correction mechanism and written back to the entry. The scrubbing operation prevents accumulation of errors that are beyond the ability of the error correction mechanism (e.g., ECC controller 216) to correct. In certain embodiments, the error correction mechanism corresponds to an ECC controller which uses hamming code to provide single error correcting double error detecting (SEC-DED).

The MMU 120 includes the TLB 122 which contains N TLB entries (TLB Entry 0, TLB Entry 1 through TLB entry N-1) used for translating virtual addresses to physical addresses, Each TLB entry includes information relating to virtual addresses, address space, validity, and physical addresses. The TLB 122 also includes a TLB controller 240, The TLB controller 240 controls translation of logical addresses to corresponding physical addresses, provides access to and controls attributes associated with these translated addresses, and controls other secondary operations of MMU 120 such as reading and writing TLB entries.

In general, when the processor core 112 makes a memory access request, the MMU 120 translates the virtual address of the request, via the TLB 122, and determines the corresponding physical address for the access. Note that some address requests contain the physical address directly, and do not require translation. The cache memory 114 then determines whether the information requested by the processor core 112 is present in cache by comparing tag information in the request to tag information in the tag array 220. If the requested information is determined to be present in cache 114, the information read from the array 230 is provided to the processor core 112. If the requested information is not present in cache 114, the system accesses the memory 104 using the physical address determined via the TLB 122. The requested information is stored within the cache 114 and is also provided to the processor core 112.

Figure 3:
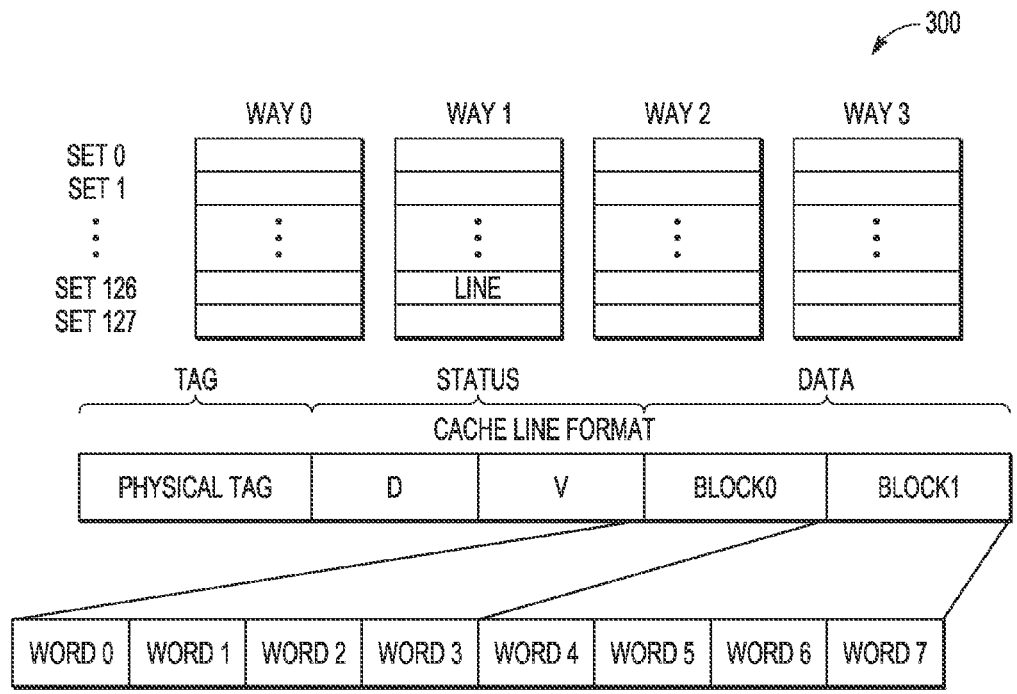
FIG. 3 shows a block a diagram of the organization of a 4-way associative cache.

Referring to FIG. 3, a block diagram showing the organization of a 4-way associative cache 300 used in one embodiment of the present invention is shown. Note that the invention is not limited to this organization or to associative caches. FIG. 3 shows a cache having 4 ways (WAY 0, WAY 1, WAY 2, and WAY 3), each having 128 sets (SET 0, SET 1, . . . SET 126, and SET 127). Each way includes a line (or sector) corresponding to each set. Therefore, for each set, there are 4 lines, one corresponding to each way. Each sector includes a plurality of blocks and each block includes at least one word location. Each line includes two blocks (BLOCK0, BLOCK1), each containing four words. Any data stored in the cache 114 is contained in one of the blocks.

Each line also includes an address tag (TAG) which corresponds to the address of the data contained in the blocks. Each line also includes a valid bit V which signifies whether or not the cache blocks BLOCK0 and BLOCK1, contain valid information. Each line also includes a dirty bit D which is set to "1" when the data contained in the line has been modified by the processor (i.e., the line contains modified data) and is therefore not consistent with the information in the corresponding physical memory location. If the data in a line is "dirty," the modified data is eventually written to the physical memory location. This process is referred to as "copy-back."

The control logic 212 of the cache 114 controls the placement and storage of information within the cache such that modified information is stored within a single way (e.g., WAY 0), or a subset of ways (e.g., WAYS 0 and 1). The cache control logic 212 controls this placement based upon the state of the dirty bit of the cache line. In this manner, the memory scrubbing controller 214 can dynamically adjust the scrubbing rates of the respective ways 114 of the cache 114 such that the way or subset of ways in which modified data are stored are scrubbed more frequently. Additionally, if data is read from one way and then modified, the modified data is stored to the more frequently scrubbed way. in this case, the location from which the data was read is invalidated so that it may be used again.

The control logic 212 maintains a predetermined sequence and process of storing all modified information of the data processing system 100 in a subset of ways 230 of the cache 114. The memory scrubbing controller 214 is controls scrubbing of the subset of the ways of the tag and/or data arrays of the cache with the modified information at a smaller interval (i.e., more frequently) compared to the rest of the ways of the tag and/or data arrays with clean information (i.e., information where the information stored within the main memory is coherent with the information stored within the cache). Because there is an additional location of the clean information (e.g., the clean information is also stored within memory 104), if a single event upset (SEU) error event occurs in a way containing clean information, the error can be detected and correct data can be reloaded from the memory 104. Ways containing potentially modified data are scrubbed more frequently in order to minimize the chances of multiple SEUs causing an uncorrectable error which cannot be recovered.

In certain embodiments, the memory scrubbing controller 214 programming and the subset of ways upon which the smaller interval is applied to the data array can be dynamically changed or controlled. By providing a differential scrubbing rate for preventing SER errors, modified data can be made more resilient to SER while consuming lower power for scrubbing operation.

Figure 4:
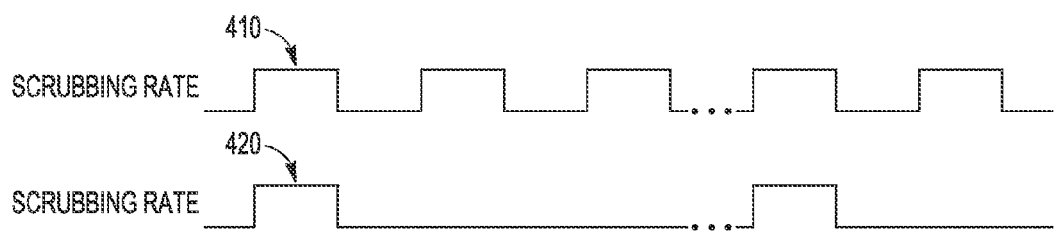
FIG. 4 shows an exemplative timing diagram of the scrubbing rate of the cache system.

Referring to FIG. 4, an exemplary timing diagram of the scrubbing rate of the cache system is shown. More specifically, a first scrubbing rate 410 is generated by the memory scrubbing controller 214. A second scrubbing rate 420 is generated by the memory scrubbing controller 214. The first scrubbing rate is smaller (i.e., has a faster frequency) than the second scrubbing rate. The scrubbing controller 212 controls the scrubbing operation so that ways within the cache in which modified information is stored (as well as associated tag arrays) are scrubbed based upon the first scrubbing rate whereas the scrubbing controller 212 controls the generalized scrubbing operation so that the remaining data array ways of the cache 114 are scrubbed based upon the second scrubbing rate. The tag and status array or tag and status arrays associated with the selected subset of ways of the cache is/are scrubbed at a higher scrubbing rate than the scrubbing rate applied to the tag and status arrays associated with ways in which non-modified data are stored.

In general, the scrubbing rate is related to the speed of the processor. For example, with a processor executing a 1 Gigahertz, the generalized scrubbing rate may occur substantially every 10 million cycles (+/−10%) while the scrubbing rate for the modified data may occur substantially every 1 million cycles (+/−10%). However, in other embodiments, the scrubbing rate for the modified data may occur anywhere from 5 times to 20 times more frequently (i.e., faster) than the generalized scrubbing rate. The scrubbing rate for the modified data may be dynamically adjusted to account for failure rate such as a failure rate that is determined based upon a mean time between failures.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, in certain embodiments, the way to which the modified information is stored may be cycled throughout the plurality of ways within the cache. Additionally, in certain embodiments, if the first way is full, another way may also be used to store the modified information. The more frequent scrubbing would occur with all ways in which modified data is stored. Additionally, in certain embodiments, the method for minimizing soil error rates within caches by controlling a memory scrubbing rate may interact with cache replacement algorithms to determine whether it is necessary to increase or decrease a number of ways in which the more frequent scrubbing occurs.

Various illustrative embodiments have been described in detail with reference to the accompanying figures. While various details are set forth in the description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, to avoid limiting or obscuring the present invention. Also for example, while the data processing system is shown with a processor having a particular architecture with a single core, other processor architectures are contemplated, including multicore type processor architectures.

Consequently, the invention is intended to be limited only by the spirit and scope of the appended claims, giving full cognizance to equivalents in all respects.

What is claimed is:

1. A cache system comprising:
a cache array, the cache array comprising a plurality of sections; and,
cache control logic, the cache control logic storing modified information to a subset of at least one of the plurality of sections; and,
a memory scrubbing controller, the memory scrubbing controller scrubbing the one of the plurality of sections at a first scrubbing rate and scrubbing another of the plurality of sections at a second scrubbing rate, the first scrubbing rate being faster than the second scrubbing rate; and wherein
if the one of the plurality of sections is full of modified information, then modified information is stored to a second of the plurality of sections and the first scrubbing rate is applied to the second of the plurality of sections.

2. The cache system of claim 1 wherein:
the memory scrubbing controller dynamically controls to which of the plurality of sections the first scrubbing rate signal is applied.

3. The cache system of claim 1 wherein:
the cache system uses a modified, exclusive, shared, invalid (MESI) protocol to maintain cache coherency.

4. The cache system of claim 3 wherein:
the modified information corresponds to a modified state within the MESI protocol.

5. The cache system of claim 1 wherein:
the cache control logic interacts with a cache replacement operation to determine when the one of a plurality of ways in a set contains modified data.

6. The cache system of claim 1 wherein:
the cache system is contained within a processor core.

7. The cache system of claim 1 wherein:
the second scrubbing rate is related to a speed of the processor core.

8. The cache system of claim 1 wherein:
the first scrubbing rate is five to twenty times faster than the second scrubbing rate.

9. The cache system of claim 1 wherein:
the first scrubbing rate is substantially every one million cycles and the second scrubbing rate is substantially every ten million cycles.

10. A method for improving error resilience comprising:
providing a cache array, the cache array comprising a plurality of sections; and,
storing modified information to a subset of at least one of the plurality of sections;
performing a scrubbing operation on the one of the plurality of sections at a first scrubbing rate; and,
performing a scrubbing operation on another of the plurality of sections at a second scrubbing rate, the first scrubbing rate being faster than the second scrubbing rate; and wherein
if the one of the plurality of sections is full of modified information, then modified information is stored to a second of the plurality of sections and the first scrubbing rate is applied to the second of the plurality of sections.

11. The method of claim 10 further comprising:
dynamically controlling to which of the plurality of sections the first scrubbing rate is applied.

12. The method of claim 10 wherein:
using a modified, exclusive, shared, invalid (MESI) protocol to maintain cache coherency.

13. The method of claim 12 wherein:
the modified information corresponds to a modified state within the MESI protocol.

14. The method of claim 10 further comprising:
applying a cache replacement operation to determine when one of a plurality of ways in a set contains modified data.

15. The method of claim 10 wherein:
the cache array is contained within a processor core.

16. The method of claim 14 wherein:
the second scrubbing rate is related to a speed of the processor core.

17. The method of claim 10 wherein:
the first scrubbing rate is five to twenty times faster than the second scrubbing rate.

18. The method of claim 10 wherein:
the first scrubbing rate is substantially every one million cycles and the second scrubbing rate is substantially every ten million cycles.

* * * * *